June 28, 1966  C. W. SCOTT ETAL  3,258,281
HERMETIC SEALED COUPLING FOR CONDUITS
Filed March 30, 1964

INVENTORS
CARL W. SCOTT
GUNTIS KUSKEVICS
BY Allen E. Botney
ATTORNEY 3,258,281
HERMETIC SEALED COUPLING FOR CONDUITS
Carl W. Scott, Sierra Madre, and Guntis Kuskevics, South Pasadena, Calif., assignors to Electro-Optical Systems, Inc., Pasadena, Calif.
Filed Mar. 30, 1964, Ser. No. 355,558
4 Claims. (Cl. 285—328)

The present invention relates in general to devices by means of which hermetic seals are provided and more particularly relates to a new apparatus of the kind mentioned that uses an aluminum foil to provide the desired seal.

It is oftentimes preferable if not necessary to couple or link two parts together, such as tubes or pipes, in an air tight manner and yet make it possible to de-couple them quickly and without difficulty when the need arises. Likewise, it is oftentimes necessary to seal off the end of a tube or pipe and yet be able to easily unseal it at will. This is especially true, for example, in those fields where the pipes or tubes are to be used in a vacuum, or under pressure or under extreme temperature conditions. In short, in many types of instances it is necessary either to interconnect pipes or tubes or to terminate them and, on those occasions, it is desirable to do so in a way that will insure that there will be no leakage at the point of connection or termination, while at the same time making it possible to rapidly disconnect them or remove their end seals. These requirements rule out the use of soldering, welding, and brazing techniques, or the like.

Several attempts have heretofore been made to resolve this problem and while they have met with some success, they have not for one reason or another, proved entirely satisfactory. Accordingly, there has remained a long-felt need to provide a relatively simple, relatively inexpensive mechanism that will make it possible to interpose an effective hermetic seal for use under the extreme operating conditions mentioned and to be able to expeditiously remove it later.

The present invention provides such a mechanism and, in accordance with the basic concept thereof, a hermetic seal is provided by pressing a layer of metal foil between two surfaces of the mechanism, one surface having a spiral pattern of grooves therein into which the metal foil is pressed to produce a very long obstacle path for any fluid and thereby preventing it from leaking through. More particularly, in accordance with a preferred embodiment of the invention, a pair of members are mounted in face-to-face relationship on the piping or tubing to be sealed. One of the members has the abovesaid spiral groove pattern in its surface while the other member has a protruding tongue that faces the grooves. The metal foil is interposed between the members and when they are pressed together by mechanical means provided for this purpose, the tongue presses the foil against the grooves. As a result, the foil enters the grooves and, in so doing, effectively seals off the space on one side of the grooves from the space on the other side of them.

It has been found that this kind of a mechanism is mechanically simple and easy to operate and, notwithstanding these facts, that it produces a very effective hermetic seal.

It is, therefore, an object of the present invention to provide a mechanism that will produce an effective hermetic seal under adverse operating conditions.

It is another object of the present invention to provide a mechanically simple, relatively inexpensive and easily operated mechanism for producing hermetic seals.

It is an additional object of the present invention to provide hermetic-sealing apparatus that can be easily mounted on and removed from piping or tubing.

It is a further object of the present invention to provide a mechanism that will produce an effective hermetic seal even under extreme pressure and/or temperature conditions.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 1:
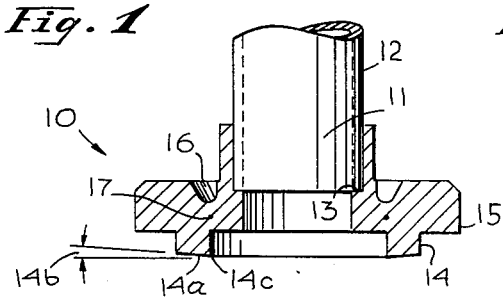
FIGURE 1 is a front view, in cross-section, of one member in a hermetic-sealing apparatus according to the present invention.
Figure 2A:
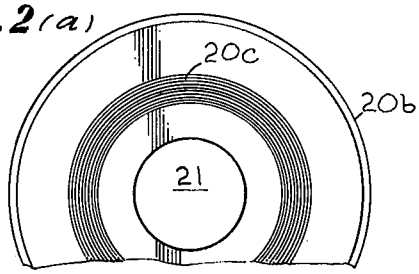
FIGURE 2(a) is a view of the top surface of the FIG. 2 member and is presented for the purpose of illustrating the pattern of spiral grooves therein.
Figure 3A:
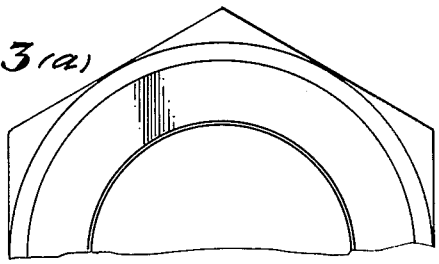
FIGURE 3(a) is a top view of the FIG. 3 element.
Figure 2:
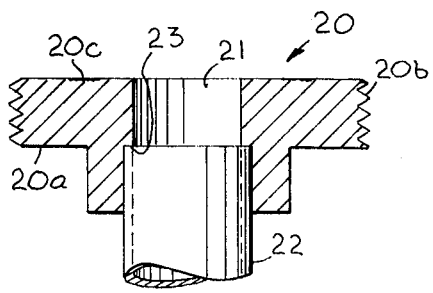
FIGURE 2 is a front view, also in cross-section, of a second member in a hermetic-sealing apparatus according to the present invention, this second member being in face-to-face relationship with said first member.
Figure 3:
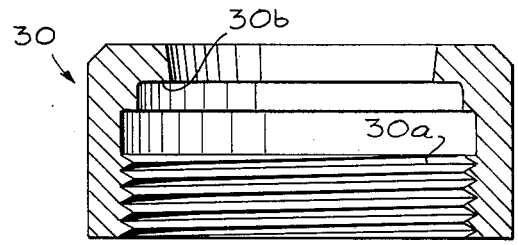
FIGURE 3 is a front view, in cross-section, of a mechanical element that is included in the apparatus for the purpose of bringing the members of FIGS. 1 and 2 together in a pressed fit.
Figure 4:
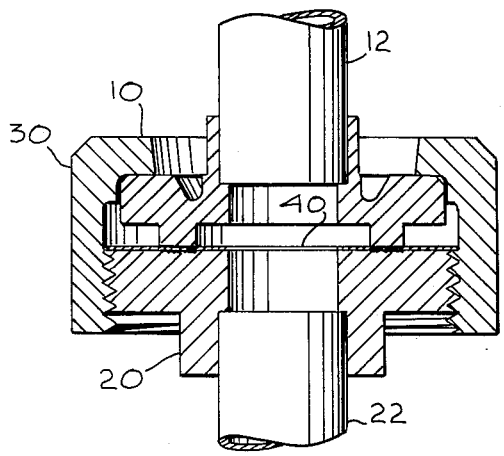
Figure 5:
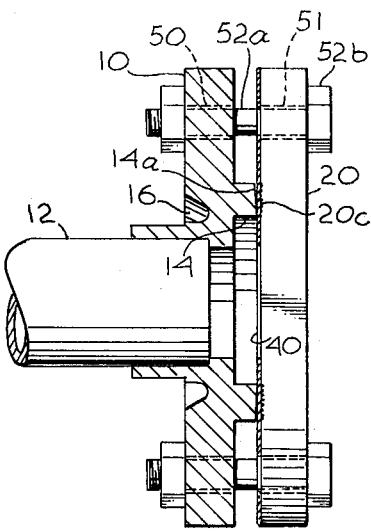

FIGURE 4 is a cross-sectional view of the elements in FIGS. 1, 2 and 3 assembled to form a complete hermetic-sealing apparatus according to the present invention and, furthermore, it illustrates how this apparatus may be used to interconnect a pair of pipes or tubes in an absolutely air tight manner; and FIGURE 5 is the FIG. 4 apparatus modified to provide an air tight seal at the end of a pipe or tube.

For a detailed description of the features of the invention, reference is now made to the figures in the drawing and to FIG. 1 in particular wherein the member, generally designated 10, is shown to be a solid of revolution having an opening 11 on one side into which a pipe or tube may be fitted as is illustrated by the outline of a pipe 12. As shown, the pipe or tube is prevented from passing entirely through the member by the shoulder 13 against which the pipe or tube abuts. On the other side of the member is a protruding element 14 which is commonly termed and which shall hereinafter be referred to as a "tongue." Since member 10 is a solid of revolution, tongue 14 is annular in shape, its front or forward surface 14a being inclined or slanted outwardly at a slight angle, such as, for example, one degree. The slant of surface 14a is illustrated by the lines forming angle 14b. As will be shown and explained later, it is this surface 14a that presses the metal foil against the spiral grooves to form the seal. In this regard, member 10 also includes a flange 15 which extends vertically outward from the main body of the member, and which is the cooperatvie means on the member that causes the tongue 14 to move forward into a pressed fit, as will subsequently be seen. Finally, member 10 is shaped to include a flexure groove 16 whose apex is intentionally made to be in a line with or in registration with the tip 14c of tongue 14 and a point 17 that is located substantially mid-way between the tongue and groove 16. Point 17 is the center of flexure and, therefore, is the point about which some slight rotation will take place if the flange 15 is pushed in one direction or another. The significance of the relationship between tongue 14, groove 16 and center of flexure 17 will be more clearly understood later.

A second member of the subject apparatus, generally designated 20, is illustrated in FIG. 2 and, as shown therein, it has a shape that resembles the capital letter T in the alphabet and is also a solid of revolution.

Member 20 has an opening 21 through it into which a pipe or tube may be fitted as is illustrated by the outline of a pipe 22. As shown, the pipe or tube is prevented from passing entirely through the member by the shoulder 23 against which the pipe or tube abuts. The head portion of member 20, designated 20a, is threaded along its peripheral surface, the threads being designated 20b. The reason for the threads will be made known later. Finally, the top or free surface of head 20a has a spiral pattern of grooves 20c in it, as is more clearly shown in the top view of member 20 presented in FIG. 2(a).

A cap or nut 30 is shown in FIG. 3 to which reference is now made. Nut 30 is designed to screw onto member 20 and for this purpose, therefore, the nut is threaded along the bottom portion of its inside surface, the threads thereon being designated 30a. Furthermore, nut 30 is designed to fit over and to hold or enclose member 10 when the latter is placed in face-to-face relationship with member 20, and, therefore, toward this end, the upper portion of the inside surface of the nut, which upper portion is designated 30b, is shaped to conform to the shape of flange 15 of member 10. A top view of nut 30 is presented in FIG. 3(a) wherein the head of the nut, for sake of convenience, is shown to have been given a hexagonal shape so that a wrench or other tools may easily grab it.

Members 10, 20 and 30 are shown assembled over a pair of pipes or tubes 12 and 22 in FIG. 4, the purpose of the assembly being to provide a hermetic seal between these pipes or tubes. Thus, pipe or tube 12 is mounted in opening 11 of member 10 and pipe or tube 22 is mounted in opening 21 in member 20, the ends of these pipes or tubes respectively abutting against shoulders 13 and 23. Each member is hermetically sealed, as by welding, soldering or brazing, to the pipe or tube on which it is mounted, with the result that it remains only to produce an air tight seal between the members to produce a corresponding air tight seal between the pipes or tubes. As was previously mentioned, this can be accomplished by means of the apparatus of the present invention which, in addition, also makes it possible to unseal the tubes without difficulty.

Thus, in assembling the apparatus in the manner shown in FIG. 4, after members 10 and 20 are mounted on and sealed to their respective pipes or tubes, an annular sheet of metal foil 40, such as aluminum foil, is interposed between the members. Nut 30, which was mounted on pipe or tube 12 prior to member 10, is then fitted over both member 10 and member 20 and turned so that it screws onto member 20. By so doing, member 10 is flexed around flexure point 17 and if nut 30 is tightened or screwed on far enough, member 10 is sufficiently flexed so that the front surface 14a of its tongue 14 presses aluminum foil 40 tightly against grooves 20c on member 20. When this happens, the metal foil is forced into the grooves to form a very long spiral path that any fluid would have to follow if it were to leak into or out of the pipes or tubes. With this kind of an impediment, the seal is leak proof even under extreme pressure and temperature conditions, thereby providing the desired hermetic seal.

In the event it is necessary to break the seal and disconnect the pipes, it is only necessary to unscrew cap 30 and slide it back, the seal thereby being broken and the pipes disconnected. As can be seen, this is a rather simple matter with apparatus according to the present invention.

It is important to note that tongue 14 rotates very little in response to the tightening action of nut 30 and this is due, primarily, to the presence and direction of groove 16 and to the fact that the apex of groove 16, center of flexure 17, and the point 14c on the tongue are in a line. This arrangement minimizes the rotational displacement of the tongue and the amount of rotation of tongue 14 is important because a large rotation might cause a shearing of the metal foil and, therefore, would result in its damage. This is obviously to be avoided, which the present invention does.

The apparatus shown in FIGS. 1–4 is for interconnecting a pair of pipes or tubes and for providing a hermetic seal at the point of interconnection. However, it is also necessary at times to seal off the end of a single pipe or tube and to seal it off in an air tight manner. The apparatus in FIGS. 1–4 may be modified or adapted for this purpose, as is illustrated in FIG. 5 to which reference is now made. As shown therein, member 10 is substantially the same as before, the only change worth mentioning being that it now has a number of holes 50 evenly spaced around its periphery. Accordingly, all its features as well as the pipe on which it is mounted are designated as they were earlier. Member 20 is also very similar to its prior description and, in fact, very closely resembles the head portion 20a as may be seen from a comparison of FIGS. 2 and 5. However, instead of threads 20b previously required for member 20, it now includes holes 51 equal in number to holes 50 and in registration therewith. The major difference or modification lies in the fact that member 30 of FIG. 3 has been eliminated and nuts and bolts for pressing members 10 and 20 together substituted for it. The bolts are designated 52a and their associated nuts 52b, the bolts fitting into and passing through holes 50 and 51. Finally, as before, an annular sheet of metal foil 40 is interposed between members 10 and 20, the foil also having appropriately spaced holes through which the bolts pass. However, due to the thinness of the foil in the figure, its holes are not visible.

The operation of this end-sealing apparatus is basically the same as that of the original apparatus. Thus, upon tightening nuts 52b, members 10 and 20 are drawn closer together, with the result that tongue 14 rotates slightly until its face 14a presses metal foil 40 into spiral grooves 20c, thereby effecting the desired end seal. To break the seal, it is only necessary to loosen the nuts and bolts and thereby unflex member 10.

Although a couple of arrangements of the invention have been presented above, the invention is not limited thereto. Thus, for example, member 20 in FIG. 5 may be modified still further by mounting a window in it so that the end of the pipe and the fluid therein may be observed. Again, by way of example, grooves other than spiral grooves 20c may be used on member 20 with equally good effect. Hence, all modifications, alterations and variations of the apparatus shown in the figures should be considered as being included in the invention as defined by the annexed claims.

Having thus described the invention, what is claimed is:

1. Apparatus for hermetically sealing the open ends of pipes, said apparatus comprising: a first member mounted in an air tight manner on the end of the pipe, said first member having a tongue element that protrudes from it, the face of said tongue element being radially outwardly inclined at a slight angle in the direction toward said first member from the vertical, said first member further having an annular flexure groove on the side thereof that is opposite said tongue element and in line therewith; a second member mounted on and in face-to-face relationship with said first member, said second member having spiral grooves in the surface thereof facing said first member, the spiral grooves being in registration with said protruding tongue element; a metal foil interposed between said first and second members; and means for tightening said first and second members together, said protruding tongue element rotating in response to said tightening together of the members until the inclined face thereof presses said metal foil into all of said grooves to produce the desired seal.

2. The apparatus defined in claim 1 wherein the apex of said flexure groove and the center of flexure are in a line with the edge of said tongue element that is closest to said second member.

3. The apparatus defined in claim 1 wherein said means includes screw threads on said first member and a threaded cap member that encloses said second member and screws onto said first member, said cap member enclosing said second member outside said flexure groove.

4. The apparatus defined in claim 1 wherein the apex of said flexure groove and the center of flexure are in a line with the edge of said tongue element that is closest to said first member, and wherein said means includes screw threads on said first member and a threaded cap member that encloses said second member and screws onto said first member, said cap member enclosing said second member outside said flexure groove.

References Cited by the Examiner

UNITED STATES PATENTS

| | | |
|---|---|---|
| 1,906,826 | 5/1933 | Smith et al. |
| 1,935,673 | 11/1933 | Smith et al. 285—328 |
| 1,936,420 | 11/1933 | Bailey 285—363 X |
| 2,274,439 | 2/1942 | Tinker 285—331 X |
| 3,002,770 | 10/1961 | Chestnut et al. 285—355 X |
| 3,135,538 | 6/1964 | George 285—363 |
| 3,211,478 | 10/1965 | Batzer 285—328 |

FOREIGN PATENTS

| | | |
|---|---|---|
| 1,112,357 | 10/1957 | Germany. |
| 130,503 | 2/1929 | Switzerland. |

CARL W. TOMLIN, *Primary Examiner.*

T. A. LISLE, *Assistant Examiner.*